Sept. 13, 1966   T. BUDZICH   3,272,279
FLUID PRESSURE OPERATED DRIVE AND CLUTCH SYSTEM
Filed June 8, 1964   4 Sheets-Sheet 1

INVENTOR
TADEUSZ BUDZICH
BY William H. Hogg
ATTORNEY

Sept. 13, 1966 T. BUDZICH 3,272,279
FLUID PRESSURE OPERATED DRIVE AND CLUTCH SYSTEM
Filed June 8, 1964 4 Sheets-Sheet 2

INVENTOR
TADEUSZ BUDZICH
BY William N. Hogg
ATTORNEY

Sept. 13, 1966  T. BUDZICH  3,272,279
FLUID PRESSURE OPERATED DRIVE AND CLUTCH SYSTEM
Filed June 8, 1964  4 Sheets-Sheet 3

INVENTOR
TADEUSZ BUDZICH
BY William N. Hogg
ATTORNEY

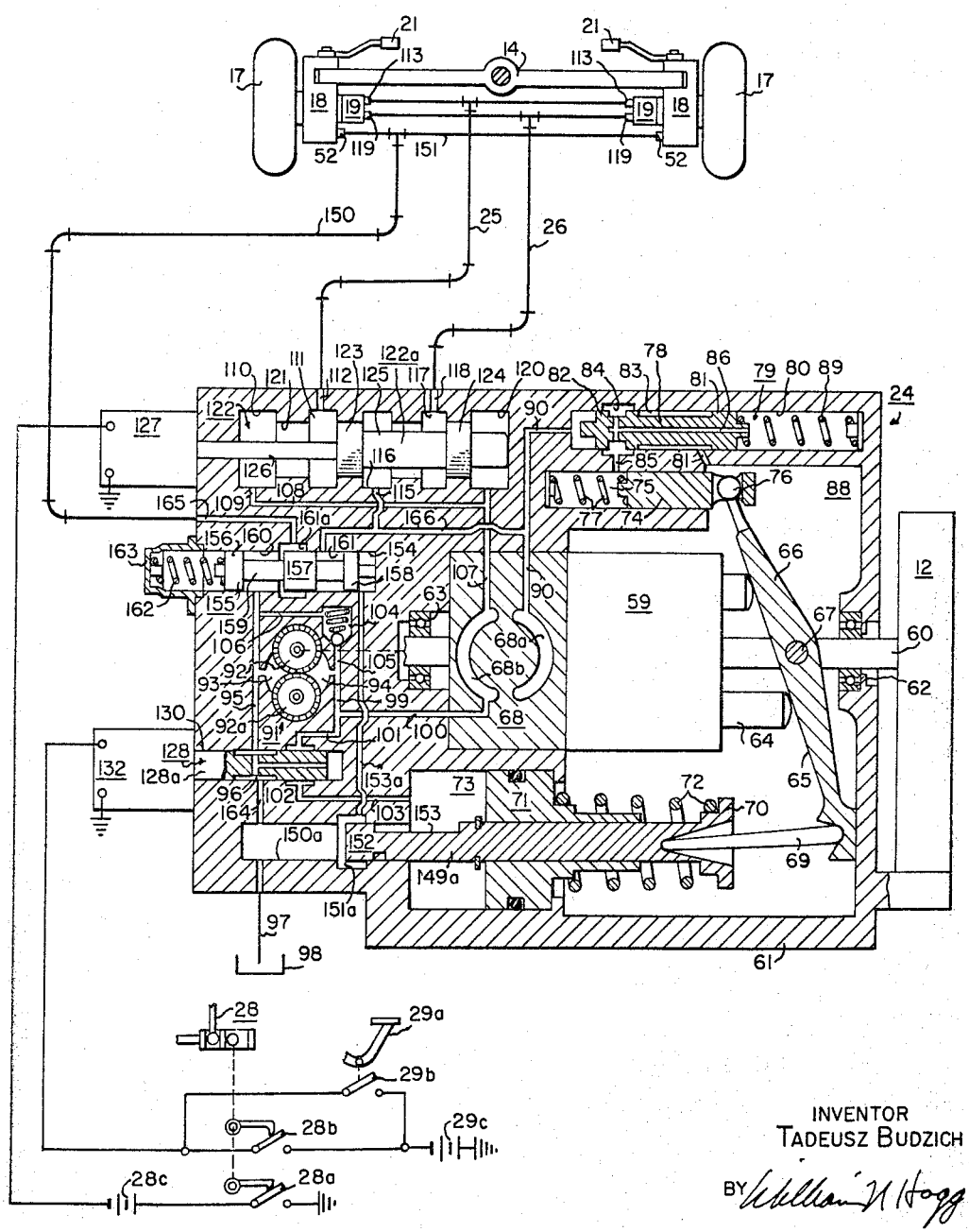

United States Patent Office 3,272,279
Patented Sept. 13, 1966

3,272,279
FLUID PRESSURE OPERATED DRIVE
AND CLUTCH SYSTEMS
Tadeusz Budzich, 3344 Colwyn Road, Cleveland, Ohio
Filed June 8, 1964, Ser. No. 373,426
12 Claims. (Cl. 180—44)

This invention relates generally to fluid power drives for self-propelled vehicles, and more particularly to front-axle fluid power drives for tractors, self-propelled farm machinery, earth moving equipment, and the like.

In still more particular aspects this invention relates to controls for front-axle fluid power drives, the controls being adapted to engage and disengage the drive under specific driving conditions.

A front-axile auxiliary fluid power drive employing a variable flow pump which is controlled by an automatic pressure responsive control, and fluid motors pivotally mounted on the steering wheels and drivingly engaged therewith will synchronize its driving effort with that of the conventional mechanical transmission for the rear wheels. In most applications, the fluid power drive will be required to perform its function only part of the time, and consequently a reliable and efficient system for effecting disengagement of this drive must be provided. The system for disengagement should include clutches interposed between the fluid motors and front wheels, which in their disengaged position will not permit transmission of torque from the front wheels to the fluid motors thereby eliminating substantial circulation power losses in the motors. The engagement and disengagement of the clutches must be integrated with the function of the fluid drive and therefore the clutches should preferably be fluid responsive.

In a fluid drive, the maximum speed of rotation of the fluid motors is related to the maximum capacity of the pump. With a vehicle driven in high gear or when travelling downhill, the demand of the fluid motors may exceed the maximum capacity of the fluid pump. Since under these conditions fluid motors will automatically reverse their function and become pumps, provision must be made to include a path for the fluid displaced by the motors to circulate within the fluid circuit of the motors. Also, very large circulation losses will take place. Therefore, for best performance and system efficiency, the fluid motors should be automatically disconnected from the front wheels, when the ground speed of the vehicle exceeds the maximum capacity of the fluid pump. The fluid motors should then remain drivingly disconnected until the ground speed of the vehicle comes within the range of the pump capacity.

It is therefore a principal object of this invention to provide in a fluid synchronizing drive an improved clutch mechanism that is operated in response to fluid system pressure and flow.

Another object of this invention is to provide in a fluid power synchronizing drive an improved automatic declutching system for drivingly connecting and disconnecting the fluid motors from the steering wheels, said system operating in response to conditions of pressure and flow within the fluid transmission system.

Still another object of this invention is to provide pressure-sensitive clutches for automatically disconnecting the driving wheels from the fluid power drive when the speed of the vehicle exceeds the capacity of the pump supplying the fluid drive.

A further object of this invention is to provide system-pressure-sensitive clutches for driving connection between the wheels and the fluid power drive, the maximum torque transmitting capacity of those clutches being proportional to the torque developed by the fluid drive.

A still further object of this invention is to provide fluid pressure sensitive clutches between the driving wheels and the fluid power drive of the vehicle and to supply pressure fluid to the clutches for operation thereof only when the speed of the vehicle remains within the capacity of the fluid drive.

Still an additional object of this invention is to provide pressure-sensitive clutches between the driving wheels and the fluid drive, said clutches producing driving capacity proportional to system pressure and therefore to the torque developed by the fluid motors.

These and other objects and advantages of the invention as well as a complete understanding thereof will be apparent from the following description and drawings in which:

FIGURE 5 is a schematic showing of still another clutch control arrangement wherein apparatus is provided for operating the flow sensitive valve when the pump trunnion is at the maximum displacement position.

Figure 1:
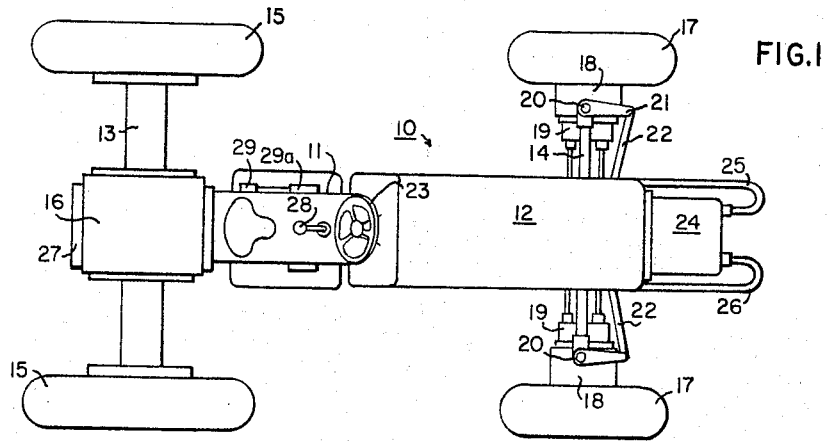
FIGURE 1 is a plan view somewhat diagrammatic of a tractor equipped with the apparatus of the present invention.

Referring now to FIGURE 1 of the drawings, a tractor generally designated as 10 is shown having a frame 11 mounting an engine 12, rear axle 13 and front axle 14. Rear wheels 15, mounted on the rear axle 13, are drivingly connected with the engine 12 by a mechanical transmission 16. Two steering front wheels 17 are provided and equipped with mechanical gear reducers 18 mounting fluid motors 19. Each combination of front steering wheel 17, gear reducer 18, and fluid motor 19 is pivotally mounted by king pin 20 in respect to front axle 14. A conventional steering arm 21, through tie rod 22, connects the front steering wheels 17 to a tractor steering wheel 23. A variable-flow fluid-power pump, generally designated as 24 is provided which is driven by the engine 12. Fluid connection between the pump 24 and the fluid motor 19 is provided by flexible ducts 25 and 26. Although FIGURE 1 shows the pump 24 directly mounted on the engine, it can be mounted if desired on pad 27 of mechanical transmission 16 or on any other suitable power take-off.

The drive-ratio of the mechanical transmission 16 is altered in the conventional manner by gear shift lever 28 which is operated in conjunction with a tractor clutch 29 connected to a clutch pedal 29a. The operation of the gear shift lever 28 and the clutch pedal 29a initiate other functions with respect to the fluid drive, as will be discussed hereinafter.

Figure 2:
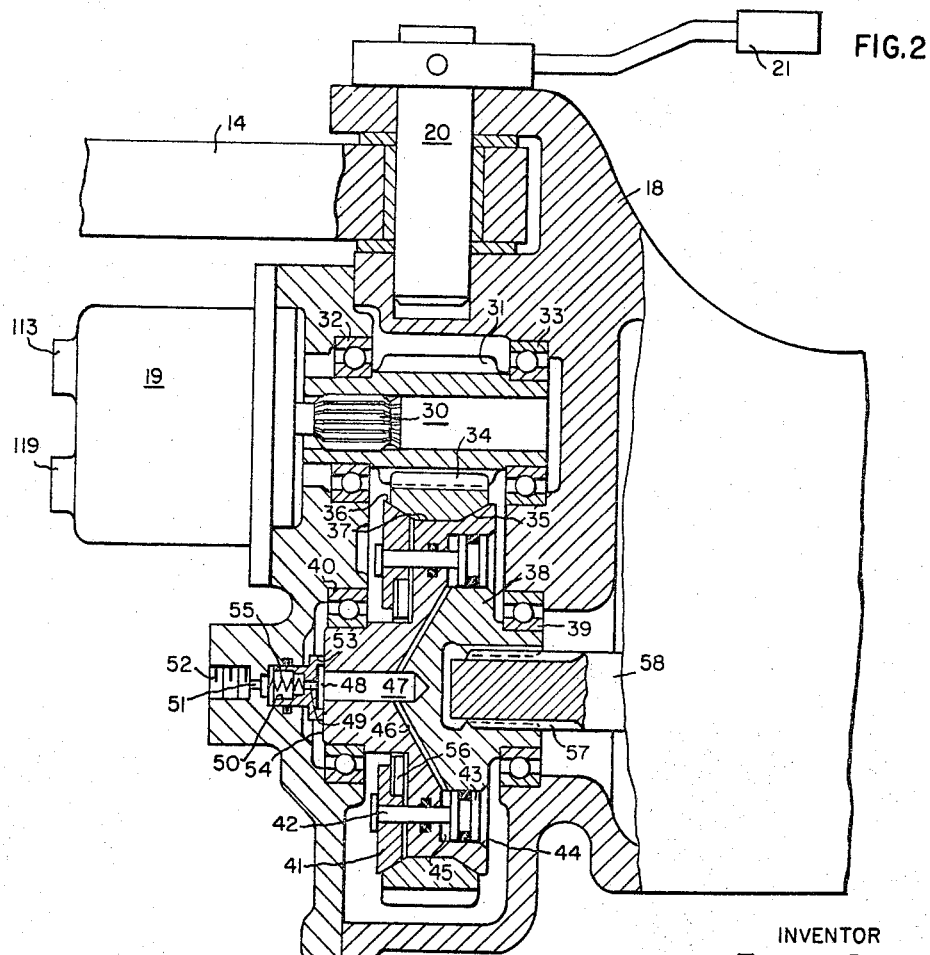
FIGURE 2 is a sectional view of the fluid responsive clutch and clutch drive arrangement of the invention, shown interposed between a conventional fluid motor and gear reducer.

Referring now to FIGURE 2 of the drawings, the fluid motor 19 drivingly engages by means of shaft 30 a pinion 31 which is suitably journalled in bearings 32 and 33. The pinion 31 meshes with a gear 34 which is guided on inclined surfaces 35 and 36 and journalled on cylindrical surface 37. The inclined surface 35 and cylindrical surface 37 are located on a clutch body 38, which is journalled for rotation by bearings 39 and 40. The inclined surface 36 is located on a clutch reaction member 41, which is retained in respect to clutch body 38 by pins 42 of hydraulic pistons 43. The hydraulic pistons 43 are suitably guided in piston bores 44 provided in the clutch body 38. Space 45, defined by the piston bore 44 and the hydraulic piston 43, is connected by drillings 46 and 47, annular space 48, drilling 49, and passages 50 and 51 to pressure port 52. A sealing sleeve 53 maintained in sealing contact on surface 54 of the clutch body 38 by the bias of spring 55, in a well-known manner, provides a seal that confines the high-pressure fluid within annular space 48. A wave spring 56 is interposed between the clutch reaction member 41 and the clutch body 38 and biases the clutch toward a position of clutch disengagement. The clutch body 38 drivingly engages, through splines 57, gear reducer shaft 58 of the gear reducer 18 shown diagrammatically in FIGURE 1.

Figure 3:
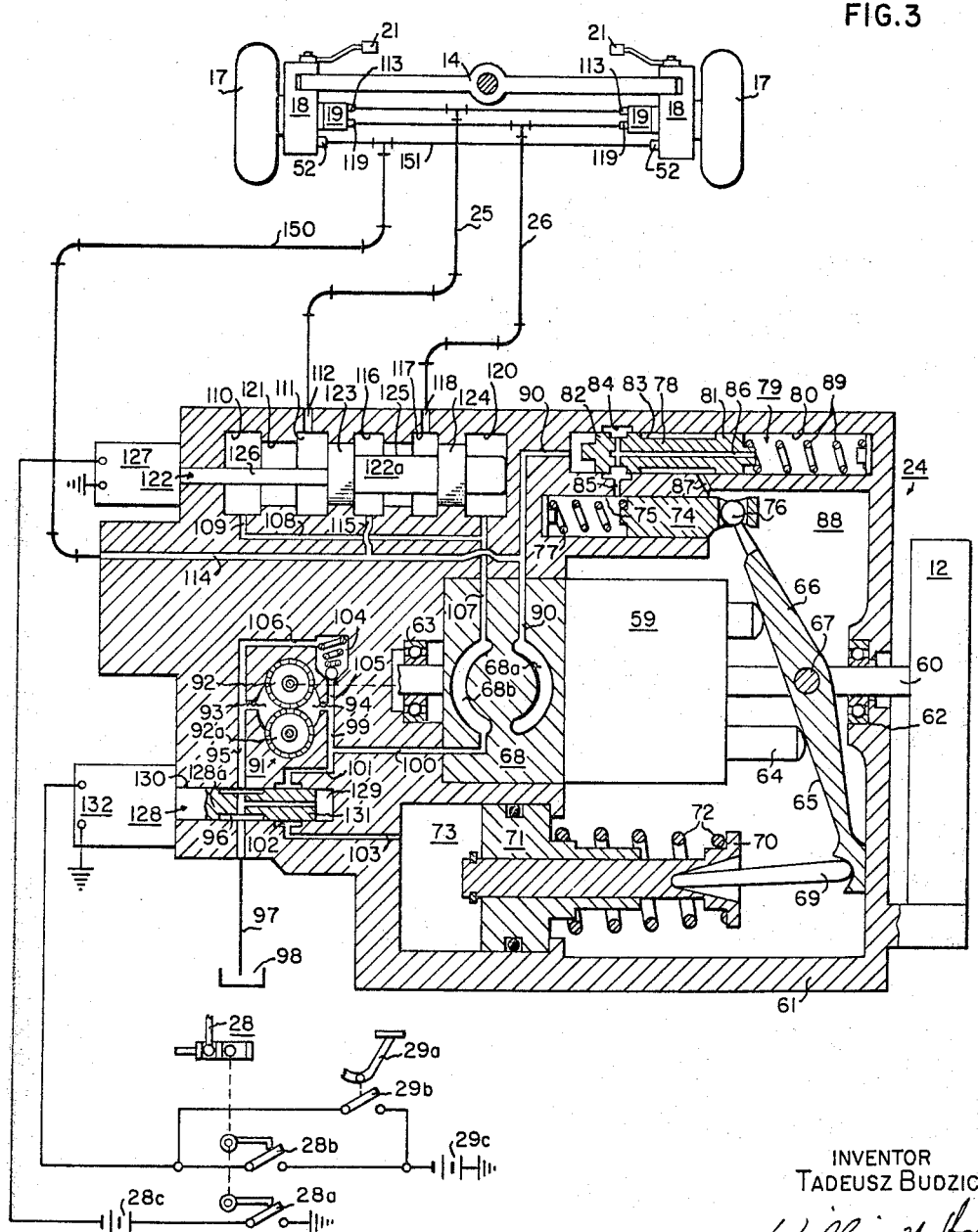
FIGURE 3 is a somewhat schematic showing of a clutch control arrangement of this invention for operation of the fluid responsive clutch of FIGURE 2.

Referring now to FIGURE 3 of the drawings the variable-flow fluid-power pump, generally designated as 24, for purposes of clearer illustration is shown with its working components diagrammatically disposed. Rotary motion is transmitted to cylinder barrel 59 from engine 12 (which is shown diagrammatically in FIGURE 1) by shaft 60. The shaft 60 is rotatably mounted relative to pump housing 61 by bearings 62 and 63. The cylinder barrel 59 has a plurality of cylinder bores (not shown) which in a well-known manner slidably guides pistons 64, which abut reaction surface 65 of trunnion 66. The trunnion 66 is mounted for limited rotation or tilting in respect to the pump housing 61 by trunnion pins 67. The cylinder barrel 59 abuts diagrammatically shown valve plate 68 (rotated 90 degrees for the purpose of clear illustration), which contains high pressure timing port 68a and low pressure timing port 68b. The trunnion 66 operationally engages through a push rod 69 a spring guide 70, which is slidably guided in an unloading piston 71. A control spring 72 is interposed between the spring guide 70 and the unloading piston 71. The unloading piston 71 is slidably guided in an unloading cylinder bore 73. The control spring 72 through the spring guide 70 and push rod 69 biases the trunnion 66 toward a position of maximum angular inclination in respect to shaft 60 which is the position shown in FIGURE 3. A control piston 74, slidably retained in control cylinder bore 75, universally engages spherical extension 76 of trunnion 66. A reaction spring 77, which is contained within the cylinder bore 75, is interposed between the pump housing 61 and the control piston 74. A control spool 78 of an automatic pressure-responsive pump control generally designated as 79 is guided in a control bore 80, and is provided with lands 81 and 82 that define an annular space 83 therebetween. An annular ring 84 is connected through passage 85 with the control cylinder bore 75 and through passage 86 of the spool 78 with control bore 80. Annular space 83 is connected through drilling 87 with space 88 defined by the housing 61 of the pump 24. Control spool spring 89 mounted within the control cylinder bore 80 is interposed between one end of the control spool 78 and one end of the bore 80. The end of the bore 80 opposite that contacting the spring 89 is connected through passage 90 with the pump high pressure port 68a.

A diagrammatically shown fixed-displacement gear pump 91 is drivingly connected to shaft 60 by a drive connection (not shown) and has a driving gear 92 and driven gear 92a. The gear pump also has an inlet port 93 and outlet port 94. The inlet port 93 of the gear pump is connected through passage 95, annular space 96, and passage 97 with diagrammatically shown reservoir 98. The outlet port 94 of the gear pump is connected through passages 99 and 100 to the low-pressure timing port 68b. The outlet port 94 is also connected through passage 101, annular space 102, and passage 103 with unloading cylinder bore 73. A conventional relief valve 104 cross-connects outlet port 94 and inlet port 93 of the gear pump through passages 105 and 106. The low-pressure timing port 68b is connected through ducts 107, 108, and 109 with annular rings 110 and 111, and through passage 112 and flexible duct 25 to low pressure ports 113 of the fluid motors 19. The high-pressure timing port 68a is connected through passage 90 and ducts 114 and 115 with annular rings 116 and 117, and through passage 118 and flexible duct 26 to high pressure ports 119 of the fluid motors 19. The high pressure timing port 68a is also connected to the ports 52 of the clutches via passage 90, duct 114, and flexible lines 150. The annular rings 110, 111, 116, 117, and 120 functionally interconnected by cylindrical bore 121 constitute timing ports of a four-way valve 122 equipped with a spool 122a. The spool 122a is equipped with lands 123 and 124 connected by spool stem 125. The spool 122 is connected by stem 126 to a solenoid 127. An unloading valve 128 is provided having a valve spool 128a that is guided in unloading valve bore 129 and is equipped with lands 130 and 131 that define annular space 96 therebetween. The unloading valve spool 128a is connected to a solenoid 132.

Figure 4:
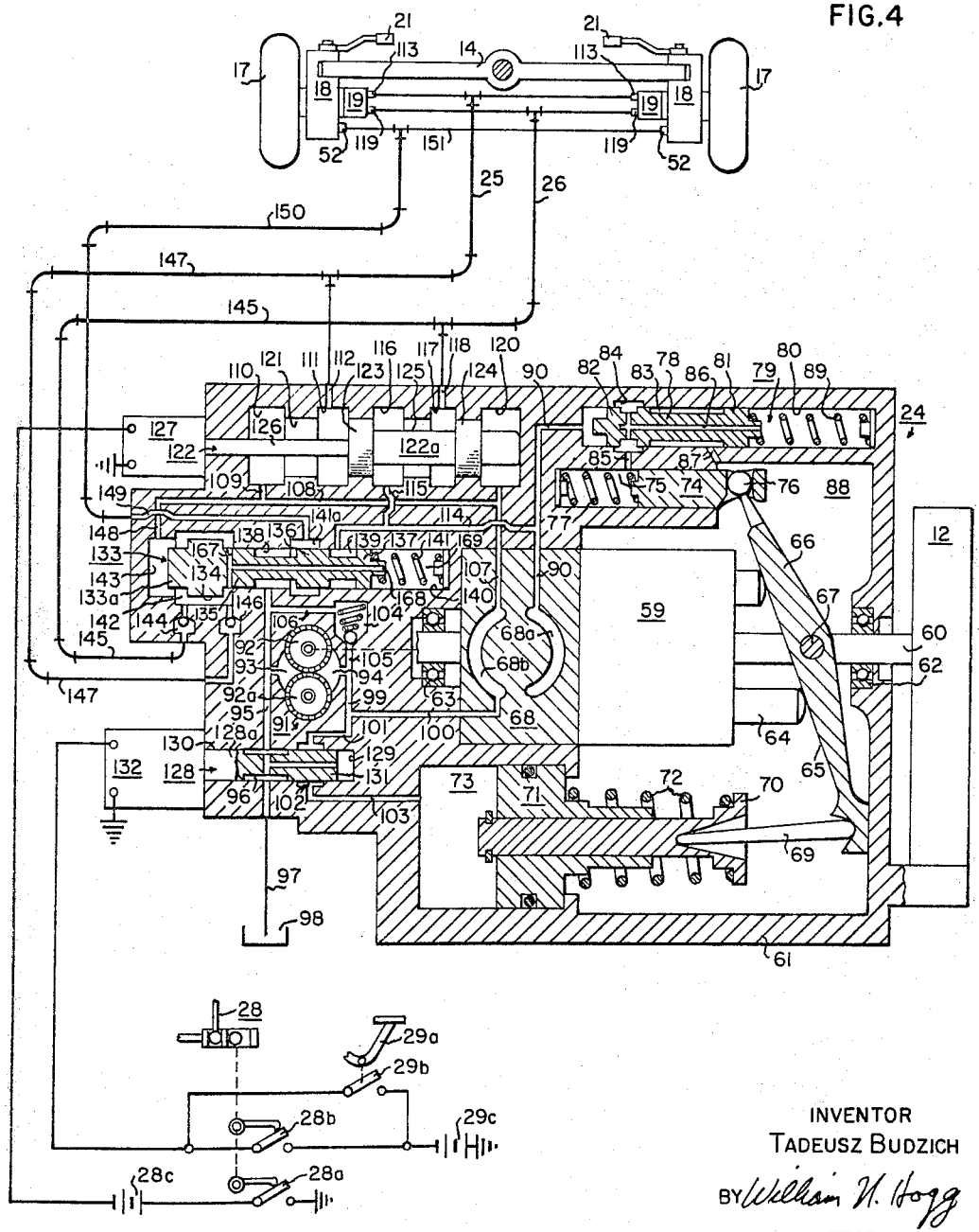
FIGURE 4 is a schematic showing of another clutch control arrangement wherein a flow sensitive valve is employed.

With reference to FIGURE 4 of the drawings an alternate clutch control arrangement is shown. The components are similar in construction and operation to those shown in FIGURE 3 but with the addition of a flow sensitive valve 133. The valve 133 includes a spool 133a, which is equipped with lands 134, 135, 136, and 137. The lands 135 and 136 define therebetween an annular space 138. The lands 136 and 137 define therebetween an annular space 139. The spool 133a is slidably guided in the valve bore 140 and is biased by spring 141. The valve bore 140 has an annular ring 141a and terminates in enlarged bores 142 and 143. The enlarged bore 142 communicates through check valve 144 and line 145 with the high pressure flexible duct 26 and through check valve 146 and line 147 with the low pressure flexible duct 25. The enlarged bore 143 communicates through passage 148 and ducts 108 and 107 with the low-pressure timing port 68b. The annular ring 141a is connected through passage 149 and flexible lines 150 and 151 with pressure ports 52 associated with the clutches and earlier described and shown in FIGURE 2. The annular space 138 is selectively connected via passages 95 and 97 to reservoir 98 through valve 128. In all other respects, the structure is substantially identical to that described with reference to FIGURE 3.

Referring now to FIGURE 5 of the drawings, a fluid power pump of similar construction to that shown in FIGURES 3 and 4 and described hereinabove is shown. The pump is equipped with different fluid drive clutch controls. The spring guide 70 is provided with an extension 149a that slidably engages bore 150a which has circumscribing it an annular ring 151a. The extension 149a terminates in land 152 and is equipped with a groove 153. The annular ring 151a communicates through passage 153a with a valve bore 154, slidably guiding valve spool 155. The valve spool 155 is equipped with lands 156, 157, and 158 interconnected by stem 159. The lands 156 and 157 define space 160, and the lands 157 and 158 define space 161. The valve bore 154 is equipped with an annular ring 161a. Biasing spring 162 is interposed between spring retainer 163 and valve spool 155. The annular space 160 through passage 95, annular space 96, passage 164, bore 150a, and passage 97 is selectively connected to reservoir 98. The annular ring 161a is connected through passage 165 and flexible ducts 150 and 151 with the pressure ports 52 associated with the clutches earlier described. The annular space 161 through passages 166 and 90 is connected to high-pressure timing port 68a. The low-pressure timing port 68b is connected through passages 100, 101, annular space 102, and passage 103 with the unloading cylinder 73, and also communicates through passage 99 with the outlet port 94 of the gear pump. In all other respects the structure is substantially identical to that described with reference to FIGURES 3 and 4.

The solenoid 127, as shown in FIGURES 3, 4 and 5 is energized when the gear shaft lever 28 is in the position for effecting reverse drive of the mechanical transmission; when in this position it closes contact 28a to complete the circuit to the solenoid from battery 28c. Likewise, when the gear shift lever 28 is in the neutral position, it closes contact 28b which completes the circuit from the battery 28c to the solenoid 132 to effect energization thereof. When the clutch pedal 29a is depressed, it closes switch 29b which also completes the circuit from the battery 29c to the solenoid 132 to effect energization thereof. Two separate batteries 28c and 29c are shown for clarity of illustration, but it is obvious a single battery or source of power could be used to operate the solenoids and the required circuitry is obvious to one skilled in the art.

Turning now to the operation of the systems, and specifically referring to FIGURE 2, mechanical gear reducer 18, transmitting power to the steering wheel is pivoted for limited rotation in respect to front axle 14 by king pin 20. The mechanical gear reducer 18 mounts fluid motor 19, provided with low pressure port 113 and high pressure port 119. Although these ports and the transmitting means associated with each will be referred to as either low or high pressure, it is to be understood that such will be reversed during driving of the wheels in the reverse direction. Fluid under pressure from the variable-flow fluid power pump is supplied to high pressure port 119 of fluid motor 19. The pressure fluid flow into the motor will in a well known manner result in rotation of the motor shaft 30. The speed of rotation of the motor shaft 30 will be proportional to the flow into the motor, the torque generated at shaft 30 being proportional to the pressure differential acting across motor ports 119 and 113. In general it can be stated that the torque developed at the motor shaft 30 will be proportional to the fluid pressure in high pressure port 119. The torque and rotary motion of motor shaft 30 is transmitted to the pinion 31 which is journalled by bearings 32 and 33 and meshes with gear 34. The torque transmitted from pinion 31 to gear 34 can only be further transmitted through clutch body 38 to gear reducer shaft 58 by the friction force components, developed on inclined surfaces 35 and 36 and cylindrical surface 37. The radial clearance between gear 34 and clutch body 38 on cylindrical surface 37 is so selected that gear 34 can revolve freely in respect to clutch body 38 with a minimum of torque losses. The cylindrical surface 37 provides radial location for gear 34 and the torque transmitted from gear 34 to clutch body 38 is mainly transmitted through the inclined surfaces 35 and 36. The inclined surface 35, provided on the clutch body 38, mates with identical inclined conical surface on gear 34. The inclined surface 36, provided on the clutch reaction member 41, mates with a corresponding inclined conical surface on gear 34. Clamping force on inclined surfaces 35 and 36, between clutch body 38, clutch reaction member 41, and gear 34, is provided by hydraulic pistons 43 connected to pins 42 that transmit the clamping froce from the clutch body 38 to the clutch reaction member 41, while also securing these components relative to each other. With high pressure fluid being introduced to space 45 and acting on hydraulic piston 43, resulting force is transmitted to the clutch reaction member 41 through pin 42 to clamp gear 34 onto inclined surfaces 35 and 36. Because of the angle of inclination of these surfaces, the resulting wedging action multiplies the effectiveness of the hydraulic force developed by the hydraulic pistons 43. The friction components of this wedging force permit transmission of the torque from gear 34 to gear-reducer shaft 58. The torque transmitting capabilities of the inclined surfaces 35 and 36 and therefore of the clutch will be directly proportional to the force developed on hydraulic pistons 43, which force in turn is proportional to the fluid pressure introduced to space 45 from pressure port 52 through drillings 46 and 47, annular space 48, drilling 49 and passages 50 and 51. As previously described, the torque generated by fluid motor 19 is directly proportional to the pressure existing at its port 119. Since the same pressure is supplied to the pressure port 52, the torque transmitting capabilities of the clutch will therefore always be proportional to the torque developed by the fluid motor 19. The pressure fluid from the pressure port 52 on its way to space 45 is effectively sealed in a well-known manner by sealing sleeve 53 as described earlier.

The wave spring 56 positioned between clutch reaction member 41 and clutch body 38 normally separates clutch reaction member 41 from clutch body 38 thereby disengaging the torque-transmitting inclined surfaces 36 and 35. In this manner, the pinion 31 and gear 34, guided on cylindrical surface 37, can revolve freely in respect to clutch body 38 without transmitting any appreciable amount of torque to gear-reducer shaft 58. This condition is consequently equivalent to the clutch being disengaged. Therefore, by variation of the fluid pressure in space 45 the clutch may be either completely disengaged or may be made to transmit torque proportional to the fluid pressure within this space.

Referring now to FIGURE 3 of the drawings, the rotary motion generated by the engine 12 is transmitted to cylinder barrel 59 through the shaft 60 and induces reciprocation in pistons 64, which follow the inclined reaction surface 65 of trunnion 66. This reciprocating motion will induce pumping, which in a well known manner is phased with high pressure timing port 68a and low pressure timing port 68b of diagrammatically shown valve plate 68. The magnitude of pressure flow generated within cylinder barrel 59 is proportional to angle of inclination of the reaction surface 65 of trunnion 66 in respect to axis of rotation of shaft 60. With reaction surface 65 perpendicular to axis of rotation of the pump, the pump flow becomes zero. With maximum angle of inclination of reaction surface 65, as shown in FIGURE 3, the pump volume output is at its maximum. The high pressure fluid from the high pressure timing port 68a is transmitted through passage 90, ducts 114 and 115, annular ring 116, cylindrical bore 121, annular ring 117, passage 118, and flexible duct 26 to high-pressure ports 119 of the fluid motors 19. The flow of high-pressure fluid will induce in a conventional manner rotation in the fluid motors 19. This rotation is transmitted through mechanical gear reducers 18 to the tractor front wheels 17. The high-pressure fluid, after performing work in fluid motors 19, is exhausted at low pressure from low-pressure ports 113 and through flexible duct 25, duct 112, annular ring 111, cylindrical bore 121, annular ring 110, and ducts 109, 108 and 107 is returned to low-pressure timing port 68b. The speed of rotation of the front wheels 17 is dictated by the surface speed of the tractor, which in turn is dictated by the speed of rotation of rear wheels 15. The tractor is driven by the rear wheels 15 connected conventionally through mechanical transmission 16 with engine 12. The driving ratio of the mechanical transmission 16 is dictated of course by the selected position of the gear-shift lever 28. Since most tractor transmissions are not adapted for what is commonly called synchronized operation, the change in mechanical driving ratio, performed by gear shift lever 28 in combination with tractor clutch 29 and tractor clutch pedal 29a, is usually performed with the tractor stationary. The driving power, derived from the engine 12 by the variable-flow fluid power pump 24 and supplied to the fluid motors, is transmitted to the steering wheels 17 and helps to propel the tractor 10 at the ground speed of the rear wheels. The speed of roation of steering wheels 17 is strictly dictated by the speed of rotation of rear wheels 15. Both the rear wheels 15 and steering wheels 17 are functionally synchronized by the ground surface. Therefore, the higher the surface speed of the tractor, the higher the speed of rotation of the steering wheels 17 and the larger the flow of high-pressure fluid required by the fluid motors 19. Since the fluid is supplied to the motors 19 by the variable flow pump 24, the volume output of the pump must vary proportionally with the surface speed of the tractor. The magnitude of the torque transmitted to steering wheels 17 is strictly proportional to the fluid pressure developed by the variable flow pump 24 and delivered to the fluid motors. The angle of inclination of trunnion 66 and therefore the volume output of the pump is regulated by the combined action of the control spring 72, the control piston 74, and the automatic pressure-responsive pump control 79. The control spring 72, acting through spring guide 70 and push rod 69, biases the trunnion 66 toward the position equivalent to maximum flow of the pump. A pressure signal supplied from automatic pressure-responsive control 79 to control cylinder 75, will react on the cross-sectional area of control piston 74, generating force proportional to the magnitude of the pressure signal. This force, transmitted through spherical extension 76, tends to overcome the bias of the control spring 72 and to rotate the trunnion 66 about trunnion pin 67 toward the position of zero pump displacement. The automatic pressure responsive control 79 is arranged in a well-known manner to supply a modulated control signal which will vary the angle of inclination of the trunnion 66 and therefore volume output of the pump to maintain a relatively constant high pressure in high-pressure timing port 68a. This pressure will remain relatively constant within a narrow range, varying from maximum to minimum as dictated by the surface speed of the tractor. The automatic pressure responsive pump control 79 includes, as earlier described, a control spool 78, guided in the control bore 80 and biased by control spool spring 89. The fluid under pressure is conducted from high-pressure timing port 68a, through passage 90 to the control bore 80, where, reacting on the cross-section area of land 82, it opposes the biasing force of the control spool spring 89. The lands 82 and 81 of the control spool 78 define annular space 83 connected through drilling 87 with low pressure space 88 within the pump 24. Movement of the control spool 78 in either direction from the position shown in FIGURE 3 will either connect annular ring 84 and therefore control cylinder 75 with high or low pressure. In the presence of an elevated pressure, the bias of the control spool will be overcome and high pressure fluid via duct 85 will be introduced to the control cylinder 75 to cause movement of the trunnion 66 toward the position of reduced pump flow. Conversely, reduction in the pressure in high-pressure timing port 68a will permit the bias of the control spool spring 89 to move control spool 78 from right to left (as viewed in FIGURE 3), connecting control cylinder 75 with the low-pressuer space 88. Under the action of control spring 72, the trunnion 66 will be rotated toward the position of increased pump flow. Control of this type is well known in the art and is not the subject of this invention. In general, a variable-displacement fluid-power pump, as shown in FIGURE 3 and equipped with this type of control will supply a constant, preselected pressure and an exact volume of high-pressure fluid to the fluid motors, as required by the speed of rotation of the steering wheels 17 and therefore the surface speed of the tractor. The control-pressure level of the transmission is dictated by the magnitude of the preload of the control spool spring 89 in its equilibrium position, as shown in FIGURE 3. The control spring 72 is maintained in its preload position by unloading piston 71. The rotation of the shaft 60 is transmitted through a mechanical connection (not shown), to gears 92 and 92a of conventional gear pump 91. This gear pump in a well-known manner generates flow of pressure fluid. It is assumed that the direction of rotation of the gear pump is such that the outlet port 94 will be the high pressure or discharge port and that inlet port 93 will be the low-pressure suction port of the pump. The fluid under pressure from outlet port 94 is transmitted through passages 99 and 101, annular space 102, and passage 103 to unloading cylinder bore 73 where it reacts on the cross-sectional area of the unloading piston 71. The pressure generated by the gear pump in outlet port 94 is so selected as to permit unloading piston 71 to compress control spring 72. The low-pressure inlet port 93 of the pump is connected through passage 95 to annular space 96, defined by the lands 130 and 131 of the unloading valve spool 128a. The unloading valve spool 128a is as earlier described connected to solenoid 132. Movement of the unloading valve spool 128 from left to right as viewed in FIGURE 3 will connect annular spaces 96 and 102 and therefore interconnect outlet port 94 and inlet port 93 of the gear pump thus effectively short circuiting the gear pump and reducing the pressure at the outlet port 94. This will unload cylinder 73. Under the action of control spring 72 and reaction spring 77, the unloading piston 71 will move from right to left as viewed in FIGURE 3 bringing the trunnion 66 into zero flow position. Movement of unloading valve spool 128a back to the position shown in FIGURE 2 will effectively isolate outlet and inlet ports 94 and 93 of the gear pump thereby increasing the pressure in outlet port 94 to the setting of conventional relief valve 104. The resulting increase in fluid pressure in unloading cylinder 73 will move the unloading piston 71 from left to right as viewed in FIGURE 3, thereby compressing control spring 72 and activating the control mechanism of variable displacement pump and therefore activating the front-wheel fluid drive. In normal position, unloading valve spool 128a remains as shown in FIGURE 3. It may be seen therefore that the fluid-power pump may be unloaded by the energization of solenoid 132 and the resulting movement of the unloading valve spool to the normal position shown in FIGURE 3. As earlier described, the solenoid 132 is energized when either the clutch pedal is depressed or the gear shift lever is in the neutral position. In this manner, the circulation losses through the system are minimized by reducing the fluid flow through the system in the absence of the transmission of driving power to the rear wheels 15 from the engine 12.

The high-pressure timing port 68a, as shown in FIGURE 3, is connected with flexible duct 26 by passage 90, ducts 114 and 115, annular ring 116, cylindrical bore 121, annular ring 117, and passage 118. The low-pressure timing port 68b is connected to flexible duct 25 through ducts 107, 108 and 109, annular ring 110, cylindrical bore 121, annular ring 111 and passage 112. In this way, the pressure fluid flows from high-pressure timing port 68a through flexible duct 25 and returns at low pressure to low-pressure timing port 68b. It may be seen therefore that fluid leaving the fluid-power pump and returning thereto passes through the passages of conventional four way valve 122, having four way valve spool 122a operable by the energization of solenoid 127. Also, the ports 52 of the clutches are subjected to high pressure fluid from the port 68a via passage 90, duct 114, and flexible lines 150 and 151. In a well known manner, movement of the spool 122 from right to left from the position shown in FIGURE 3, upon energization of solenoid 127, will connect high-pressure timing port 68a with flexible duct 25 and connect flexible duct 26 with low-pressure timing port 68b. Since the direction of flow of fluid in the flexible ducts 25 and 26 will be reversed, the direction of rotation of the tractor front wheels 17 will also be reversed. It may be seen, therefore, that the direction of rotation of the front wheels may be reversed by the energization of the solenoid 127. Annular rings 110 and 120 of the valve 122 remain in both instances of valve function in direct communication with the low-pressure timing port 68b. As earlier described, the solenoid 127 is energized when the gear shift lever is in the reverse position. In this manner, the reversal of the drive of the driving wheels and steering wheels is effected simultaneously. In instances of operation when the demand of the fluid motors exceeds the capacity of the variable flow pump and consequently the pressure in high pressure port 68a tends to be lowered, the pressure at port 52 will correspondingly drop. This action will lower the force opposing the biasing force of the wave spring 56 of the clutch and consequently bring the clutch to a semi-unloaded condition. In the semi-unloaded condition, an equilibrium is reached between clutch disengagement and the degree to which the demand of the fluid motors exceeds the capacity of the variable-flow fluid power pump. However, the degree of pressure drop in the high pressure port 68a required to provide clutch disengagement is dictated by the characteristics of the wave spring 56, which because of its required relatively large size cannot be extremely sensitive to changes in the fluid forces opposing it. Therefore, the degree of clutch disengagement will not be accurately responsive to the degree of pressure decrease at the port 52.

With the arrangement of FIGURE 4, however, the employment of the flow-sensitive valve 133 and the relatively small and consequently sensitive biasing spring 137 associated therewith permits more accurate response when the capacity of the variable-flow pump is exceeded.

As shown in FIGURE 4, pressure ports 52 of the two fluid operated clutches, one of which is shown in FIGURE 2 and earlier described, are connected through lines 151 and 150, and passage 149 to reservoir 98. The spool 133a of the flow sensitive valve 133 under normal working conditions connects annular ring 141a, through duct 114 and passage 90, with high pressure timing port 68a. Therefore, high pressure fluid generated by the variable flow fluid power pump 24 is continuously supplied to pressure fluid ports 52 energizing the fluid-responsive clutches. As earlier described, with reference to FIGURE 2, the torque-transmitting capability of the clutches is directly proportional to pressure generated by the fluid power pump. Since the torque generated by the fluid motors 19 is also proportional to the discharge pressure of the fluid power pump, the torque-transmitting capability of the fluid-responsive clutches will always remain within the torque-generating capabilities of the fluid motors. The energization of the solenoid 132, in the manner previously described, and the resulting movement of the unloading valve spool 128a will short circuit outlet and inlet ports 94 and 93, respectively, of the gear pump causing the trunnion 66 to assume a vertical position which as previously explained is equivalent to zero flow of the fluid-power pump. The pressure in the high-pressure timing port 68a and therefore in the hydraulic pistons 43 of the fluid responsive clutches will drop to a minimum value. In this instance, the wave spring 56 at each clutch will disengage the clutches and thereby drivingly disconnect the fluid motors 19 from the steering wheels 17. Therefore, as described above, energization of the solenoid 132 will not only unload the variable flow fluid power pump, bringing it into zero pressure and zero flow condition, but will automatically disengage the clutches and therefore disengage the fluid motors from the front steering wheels. Under those conditions, the tractor can be propelled by its mechanical transmission without inducing any circulation losses in the fluid motors 19. With front wheel drive activated and pressure fluid supplied to the fluid motors, the fluid responsive clutches will automatically engage, permitting transmission of torque from the fluid motors to the front steering wheels. This transmission of torque will occur in an uninterrupted fashion as long as the combined flow demand of the fluid motors 19 does not exceed the maximum output capacity of the variable-flow fluid-power pump 24. Once the surface speed of the tractor and the resulting speed of rotation of the steering wheels 17 create a flow demand in fluid motors that exceeds the capacity of the variable-flow fluid-power pump 24, the pressure in the high-pressure timing port 68a and the fluid lines feeding the fluid motors from this pump will drop instantaneously to a low value. If the clutches would remain engaged, permitting transmission of torque from steering wheels 17 to fluid motors 19, the motors would become pumps, developing vacuum in the high pressure timing port 68a. The resulting cavitation in a very short time would destroy the pump 24. However, with the present invention as herein described, a drop in pressure in high-pressure timing port 68a which signifies that the demand of the fluid motors exceeds the capacity of the fluid-power pump, will automatically cause a compensating disengagement of the fluid clutches to prevent cavitation of the fluid-power pump. This feature will be retained with the fluid transmission working in both the forward-drive or reverse-drive condition, since in both of those cases the polarity of the pump timing ports remains unchanged. As shown in FIGURE 4, the spool 133a of the flow sensitive valve 133 is in an unloaded position, the fluid responsive clutches being connected through annular ring 141a and annular space 138 to reservoir 98. Under overspeed conditions the spool 133a is maintained in this position, against the bias of the spring 141, by the fluid pressure distribution acting on its cross-sectional area. Since flexible ducts 25 and 26, connecting the four-way valve 122a with the fluid motors, are phased with lines 145 and 147 and check valves 144 and 146 with enlarged bore 142 of flow sensitive valve, any sudden pressure drop in either flexible duct 25 or 26 at overspeed condition will be transmitted to enlarged bore 142. Since valve bore 169 is connected through passages 168 and 167 with the enlarged bore 142, this low pressure will act on the cross-section area of the spool 133. The enlarged end 143, through passage 148, ducts 108 and 107, low pressure timing port 68b, passages 100 and 99, is connected to the outlet port 94 of the gear pump. Therefore, the pressure differential between the enlarged bore 143 and enlarged bore 142 and valve bore 169 will provide sufficient force to compress spring 141 and, as long as the overspeed condition persists, maintain spool 133 in the position as shown in FIGURE 4. This use of the flow-sensitive valve permits operation of the clutches during a tractor overspeed condition at much reduced power levels. With the use of the flow-sensitive valve, the amount of the necessary pressure drop in the high pressure timing slot 68a to effect clutch disengagement is not dictated by the characteristics of the wave spring 56 as is the case with the arrangement of FIGURE 3, but by the biasing force of spring 141, which can be selected at much lower value than that of the wave spring. During normal power transmitting operation of the fluid drive, the check valves 144 and 146 isolate the pressure developed in the transmission lines from enlarged bore 142. The action of the unloading valve remains the same both for forward and reverse drive conditions.

FIGURE 5 shows a different method of disengagement of fluid responsive clutches under tractor overspeed conditions. Although with the arrangement, as shown in FIGURE 4, the power levels transmitted through the clutch, in disengaged condition, are very low, nevertheless, complete clutch disengagement can never take place. With the clutch unloading system as shown in FIGURE 5, the clutch disengagement at tractor overspeed condition becomes complete. The valve spool 155 of FIGURE 5 is biased by spring 162 to the position shown and connects through line 150 the ports 52 of the fluid responsive clutches with reservoir 98. Movement of the spool 155 from right to left as viewed in FIGURE 5 will connect line 150 and therefore fluid responsive clutches with high-pressure timing port 68a via passage 166. Therefore the above described position of the spool 155 corresponds to normal power operation of fluid drive. Land 152, located on spring guide 70, slidably engages bore 150a which is provided with annular ring 151a. Annular ring 151a, through passage 153a, is connected to valve bore 154. Movement of land 152, in respect to annular ring 151a, will connect annular ring 151a and therefore valve bore 154 either with low-pressure reservoir 98 or outlet port 94 of the gear pump. With land 152 in the position shown in FIGURE 5. valve bore 154 is connected to reservoir 98. The valve spool 155, under action of spring 162, will move from left to right to the position shown in FIGURE 5, connecting line 150 and therefore the clutches to reservoir 98. The movement of the land 152 to the left from the position as shown will connect valve bore 154 to outlet port 94 of the gear pump, resulting in spool 155 being moved against bias of spring 162 from right to left, connecting the line 150 and therefore fluid responsive clutches to high pressure timing port 68a. Since the position of land 152 dictates engagement or disengagement of the clutches and since the position of land 152 is strictly related to the angular inclination of the trunnion 66 and therefore flow output of the pump, the engagement and disengagement of the clutches will depend on the flow output of the pump. As shown in FIGURE 5, the position of land 152, equivalent to the disconnected condition of the clutches, can only occur with trunnion 66 at its maximum angular inclination, corresponding to the maximum pump flow. Since the maximum pump flow can only be reached with the tractor approaching the overspeed condition, the overspeed condition will cause the clutches to be disconnected. In any other position of the trunnion 66 than that corresponding to maximum flow, the land 152 and spool 155 will connect fluid clutches to high pressure timing port 68a. While driving, occurrence of the overspeed condition will automatically and completely disengage the fluid responsive clutches, maintaining the fluid drive disengaged even when the tractor speed is reduced. The fluid drive will remain disengaged until the energization of the solenoid 132 unloads, in a manner as previously described, the variable flow pump. This operation followed by activation of the pump control by the energization of solenoid 132 will engage the fluid drive and fluid responsive clutches. From then on the clutches will become disengaged only with the pump becoming unloaded by solenoid 132 or under an overspeed condition of the tractor.

Although various specific embodiments of the invention have been shown and described herein, it is obvious to those skilled in the art to which the invention pertains that other adaptations and modifications may be made without departing from the scope and spirit of the appended claims.

What is claimed is:

1. In a self-propelled vehicle having a frame, engine, and driving wheels mounted on said frame, driving means interposed between said engine and said driving wheels, at least one steering wheel pivotally mounted on said frame, the combination therewith of a fluid power transmission and control system drivingly connected to each of said steering wheels comprising, a fluid motor mounted on each of said steering wheels and drivingly engaged therewith, a variable flow pump connected to supply pressure fluid to each of said motors, pressure responsive control means to vary the flow of said pressure fluid from said pump to maintain relatively constant system pressure, system-pressure sensitive clutch means interposed between each of said fluid motors and said steering wheels, said clutch means having force generating means disposed to supply an actuating force proportional to the system pressure to the clutch means, and duct means to supply fluid pressure from said variable flow pump to said system pressure sensitive clutch means.

2. In a self-propelled vehicle having a frame, engine, and driving wheels mounted on said frame, driving means interposed between said engine and said driving wheels, at least one steering wheel pivotally mounted on said frame, the combination therewith of a fluid power transmission and control system drivingly connected to each of said steering wheels comprising, a fluid motor mounted on each of said steering wheels and drivingly engaged therewith, a variable flow pump connected to supply pressure fluid to each of said motors, pressure responsive control means to vary the flow of said pressure fluid from said pump to maintain relatively constant system pressure, system-pressure sensitive clutch means interposed between each of said fluid motors and said steering wheels, said system pressure sensitive clutch means having force generating means disposed to supply an actuating force proportional to the system pressure to the clutch means, and flow sensitive valving means for selectively connecting and disconnecting said force generating means with fluid pressure from said variable flow pump responsive to the flow condition sensed by the valving means.

3. The combination of claim 2 characterized by means for connecting said force generating means with a low-pressure reservoir when disconnected by said valving means from the fluid pressure from said variable flow pump.

4. In a self-propelled vehicle having a frame, engine, and driving wheels mounted on said frame, driving means interposed between said engine and said driving wheels, at least one steering wheel pivotally mounted on said frame, the combination therewith of a fluid power transmission and control system drivingly connected to each of said steering wheels comprising, a fluid motor mounted on each of said steering wheels and drivingly engaged therewith, a variable flow pump connected to supply pressure fluid to each of said motors, pressure responsive control means to vary the flow of said pressure fluid from said pump to maintain relatively constant system pressure, system-pressure sensitive clutch means interposed between each of said fluid motors and said steering wheels, said system pressure sensitive clutch means having force generating means disposed to supply an actuating force proportional to the system pressure to the clutch means, and pump capacity sensing valving means for selectively connecting and disconnecting said force generating means with fluid pressure from said variable flow pump responsive to the pump capacity sensed by the valving means.

5. In a self-propelled vehicle having a frame, engine and driving wheels mounted on said frame, driving means interposed between said engine and said driving wheels, steering wheels pivotally mounted on said frame, the combination therewith of a fluid power transmission and control system drivingly connected to said engine and said steering wheels comprising, a fluid motor mounted on each of said steering wheels and drivingly engaged therewith, a variable flow pump connected to supply pressure fluid to said motors, pressure responsive control means to vary the flow of said pressure fluid from said pump to maintain relatively constant system pressure, system pressure sensitive clutch means interposed between said fluid motors and said steering wheels, said clutch means having torque transmitting means, fluid actuated pressure responsive force generating means arranged to transmit force to said torque transmitting means, biasing means between said torque transmitting means and said force generating means disposed to urge said torque transmitting means toward disengagement in opposition to said force generating means, and means to selectively connect and disconnect said pressure responsive force generating means with fluid pressure from said variable flow pump, whereby said clutch means can disengage said steering wheels from said fluid motors when said variable flow pump reaches its maximum flow capacity.

6. In a self-propelled vehicle having a frame, engine and driving wheels mounted on said frame, driving means interposed between said engine and said driving wheels, steering wheels pivotally mounted on said frame, the combination therewith of a fluid power transmission and control system drivingly connected to said engine and said steering wheels comprising, a fluid motor mounted on each of said steering wheels and drivingly engaged therewith, a variable flow pump driven by said engine and disposed to supply pressure fluid to said motors, pressure responsive control means to vary the flow of pressure fluid from said pump to maintain relatively constant system pressure, a low pressure fluid reservoir to supply said variable flow pump, system pressure sensitive clutch means interposed between said fluid motors and said steering wheels, said clutch means having torque transmitting means, fluid actuated pressure responsive force generating means disposed to transmit force to said torque transmitting means, biasing means between said torque transmitting means and said force generating means disposed to urge said torque transmitting means toward disengagement in opposition to said force generating means, and pump capacity sensing valving means to selectively connect said pressure responsive force generating means with fluid pressure from said variable flow pump and with said reservoir, whereby said clutch means can disengage said steering wheels from said fluid motors when said variable flow pump reaches its maximum flow capacity.

7. In a self-propelled vehicle having a frame, an engine and driving wheels mounted on said frame, driving means interposed between said engine and said driving wheels, steering wheels pivotally mounted on said frame, the combination therewith of a fluid power transmission and control system interposed between said engine and said steering wheels comprising, a fluid motor mounted of each of said steering wheels and drivingly engaged therewith, fluid responsive clutch means interposed between each of said fluid motors and said steering wheels, said clutch means having clutch spring means biasing said clutch means toward a position of disengagement in opposition to the fluid actuation thereof, system pressure sensitive force-generating means disposed to move said clutch means toward a drive engaging position, a variable flow pump driven by said engine, said variable flow pump having flow changing means, pressure responsive control means to operate said flow changing means to vary the flow of said pressure fluid from said pump to maintain a relatively constant system pressure, first duct means normally connecting said variable flow pump and said fluid motors, second duct means normally connecting pressure fluid from said variable flow pump to said force generating means of said fluid responsive clutch means, and flow sensitive valving means in said second duct means arranged to selectively connect and disconnect pressure fluid from said variable flow pump to said force generating means in response to change in flow of said variable flow pump.

8. The combination of claim 7 further characterized by said flow sensitive valving means including spool means arranged to selectively connect said force generating means of said fluid responsive clutch means with high and low pressure fluid, control spring means biasing said spool means toward a position connecting said force generating means with said high pressure fluid, and flow responsive actuating means opposing the biasing force of said control spring means and arranged to move said spool means toward a position connecting said force generating means with low pressure fluid, whereby said force generating means will deactivate said fluid responsive clutch means when a selected valve of the variable flow pump is reached.

9. In a self-propelled vehicle having a frame, an engine and driving wheels mounted on said frame, driving means interposed between said engine and said driving wheels, steering wheels pivotally mounted on said frame, the combination therewith of a fluid power transmission and control system interposed between said engine and said steering wheels comprising, a fluid motor mounted on each of said steering wheels and drivingly engaged therewith, fluid responsive clutch means interposed between said fluid motors and said steering wheels, said clutch means having clutch spring means biasing said clutch means toward a position of disengagement in opposition to the fluid actuation thereof and system-pressure-sensitive force-generating means arranged to move said clutch means toward a drive engaging position, a variable flow pump driven by said engine, said variable flow pump having a flow changing mechanism, pressure responsive control means to operate said flow changing mechanism to vary the flow of said pressure fluid from said pump to maintain a relatively constant system pressure, first duct means connecting said variable flow pump and said fluid motors, second duct means normally connecting pressure fluid from said variable flow pump to said force generating means of said fluid responsive clutch means, valving means in said second duct means arranged to selectively connect and disconnect pressure fluid from said variable flow pump to said fluid responsive clutch means, and means responsive to the capacity of said variable flow pump for operating said valving means, whereby said fluid responsive clutch means will disconnect said fluid motors from said steering wheels when the pump reaches its maximum capacity.

10. In a self-propelled vehicle having a frame, an engine and driving wheels mounted on said frame, driving means interposed between said engine and said driving wheels, steering wheels pivotally mounted on said frame, the combination therewith of a fluid power transmission and control system interposed between said engine and said steering wheels comprising, a fluid motor mounted on each of said steering wheels and drivingly engaged therewith, fluid responsive clutch means interposed between each of said fluid motors and said steering wheels, said clutch means having a clutch spring means biasing said clutch means toward a position of disengagement, and system-pressure-sensitive force-generating means arranged to move said clutch means toward a drive engaging position in opposition to said clutch spring means, a variable flow pump driven by said engine, said variable flow pump having a flow changing mechanism, pressure responsive control means to operate said flow changing mechanism to vary the flow of pressure fluid from said pump to maintain a relatively constant system pressure, first duct means connecting said variable flow pump and said fluid motors, second duct means connecting pressure fluid from said variable flow pump to said force generating means of said fluid responsive clutch means, valving means in said second duct means arranged to selectively connect and disconnect pressure fluid from said variable flow pump to said fluid responsive clutch means, and means responsive to said flow changing mechanism of said variable flow pump for operating said valving means, whereby said fluid responsive clutch means will disconnect said fluid motors from said steering wheels when the flow changing mechanism reaches its maximum flow position.

11. The combination of claim 10 further characterized by said flow changing mechanism including an angularly displaceable trunnion and said means responsive to the flow changing mechanism of said variable flow pump for operating said valving means including linearly positionable means connected to said trunnion and adapted for linear movement by the angular displacement of said trunion.

12. The combination of claim 10 further characterized by said valving means including spool means arranged to selectively connect said fluid responsive clutch means with high and low pressure fluid, control spring means biasing said spool means toward a position connecting said clutch means with high pressure fluid, and means responsive to said flow changing mechanism of said variable flow pump opposing the biasing force of said control spring means and arranged to move said spool means toward a position connecting said clutch means with low pressure fluid when said flow changing mechanism is in its maximum flow position, whereby the fluid motors will be disconnected from the steering wheels when the flow changing mechanism reaches maximum flow position.

(References on following page)

References Cited by the Examiner

UNITED STATES PATENTS

| | | | |
|---|---|---|---|
| 2,731,569 | 1/1956 | Cardillo et al. | 60—53 X |
| 2,913,061 | 11/1959 | Beyerstedt et al. | 180—51 X |
| 3,053,043 | 9/1962 | Knowler | 180—66 X |
| 3,063,381 | 11/1962 | Budzich | 103—162 |

FOREIGN PATENTS 791,903  3/1958  Great Britain.

BENJAMIN HERSH, *Primary Examiner.*

M. L. SMITH, *Assistant Examiner.*

UNITED STATES PATENT OFFICE
CERTIFICATE OF CORRECTION

Patent No. 3,272,279                                September 13, 1966

Tadeusz Budzich

It is hereby certified that error appears in the above numbered patent requiring correction and that the said Letters Patent should read as corrected below.

Column 7, line 51, for "pressuer" read -- pressure --; column 13, line 25, for "of" read -- on --.

Signed and sealed this 1st day of August 1967.

(SEAL)
Attest:

Edward M. Fletcher, Jr.                        EDWARD J. BRENNER

Attesting Officer                              Commissioner of Patents